(12) United States Patent
Ramaswamy et al.

(10) Patent No.: US 6,904,031 B1
(45) Date of Patent: Jun. 7, 2005

(54) RETRIEVING STORED DATA FROM A BASE UNIT OF A MULTI-LINE WIRELESS PHONE SYSTEM

(75) Inventors: Kumar Ramaswamy, Indianapolis, IN (US); Paul Gothard Knutson, Indianapolis, IN (US)

(73) Assignee: Thomson Licensing S.A., Boulogne-Billancourt (FR)

( * ) Notice: Subject to any disclaimer, the term of this patent is extended or adjusted under 35 U.S.C. 154(b) by 0 days.

(21) Appl. No.: 09/581,193
(22) PCT Filed: Sep. 1, 1998
(86) PCT No.: PCT/US98/18087
§ 371 (c)(1),
(2), (4) Date: Nov. 15, 2000
(87) PCT Pub. No.: WO99/31825
PCT Pub. Date: Jun. 24, 1999

Related U.S. Application Data
(60) Provisional application No. 60/069,555, filed on Dec. 12, 1997.

(51) Int. Cl.[7] .............................................. H04B 7/212
(52) U.S. Cl. ...................................................... 370/337
(58) Field of Search ................................. 370/337, 347, 370/352–356

(56) References Cited

U.S. PATENT DOCUMENTS

| | | | | |
|---|---|---|---|---|
| 5,521,925 A | * | 5/1996 | Merakos et al. | 370/337 |
| 6,111,863 A | * | 8/2000 | Rostoker et al. | 370/329 |
| 6,172,971 B1 | * | 1/2001 | Kim | 370/348 |

FOREIGN PATENT DOCUMENTS

| | | | | |
|---|---|---|---|---|
| DE | 3130176 | 2/1983 | | H04B/7/26 |
| EP | 399611 | 11/1990 | | H04M/1/72 |

* cited by examiner

*Primary Examiner*—Chi Pham
*Assistant Examiner*—Thai Hoang
(74) *Attorney, Agent, or Firm*—Joseph S. Tripoli; Robert B. Levy; Joseph J. Kolodka

(57) ABSTRACT

A wireless telephone system comprises a base unit and a plurality of wireless handsets. The base unit has a base transceiver and a memory for storing stored information. Each handset has a handset transceiver for establishing a data link and an audio link with the base unit via the base transceiver, wherein the data link is for transmitting signaling information and the audio link is for transmitting voice data for a real-time telephone call. The handset requests from the base unit certain stored information. In response, the base unit retrieves the requested stored information from the memory and transmits the stored information to the handset via the audio link.

14 Claims, 2 Drawing Sheets

RETRIEVING STORED DATA FROM A BASE UNIT OF A MULTI-LINE WIRELESS PHONE SYSTEM

This application claims benefit of 60/069,555 filed Dec. 12, 1997.

BACKGROUND OF THE INVENTION

1. Field of the Invention

The present invention relates to multi-line wireless telephone systems and, in particular, to data transmission in a time-division multiplexed (TDM) wireless telephone system.

2. Description of the Related Art

The use of telephones and telephone systems, including wireless telephone systems, is widespread. In wireless telephone systems, a cordless or wireless telephone handset unit communicates via either analog or digital radio signals with a base unit, which is typically connected via a standard telephone line to an external telephone network. In this manner, a user may employ the wireless handset to engage in a telephone call with another user through the base unit and the telephone network.

Multi-line wireless telephone systems are in use in various situations, such as businesses with many telephone users. Such systems employ a handset that communicates with up to N handsets simultaneously, typically with digital communications schemes, such as a spread-spectrum, time division multiple access (TDMA). In a TDMA system, a single RF channel is used, and each handset transmits and receives audio data packets as well as non-audio data packets during dedicated time slices or slots within an overall TDMA cycle or epoch. It is desirable to provide various features, such as private branch exchange (PBX) features and capabilities, in a multi-line wireless telephone system. It is also desirable to transmit or retrieve non-audio data over the RF channel. For example, a handset may wish to retrieve certain stored data, such as voice mail or caller ID data, which is stored in the base unit or in a device coupled to the base unit.

European Patent Application No. 0 399 611, filed 22, May 1990, describes a communications system for data transmission over a time division duplex frequency channel, in which TDMA is used for forward and reverse transmissions between a primary and secondary station.

SUMMARY

A wireless telephone system comprising a base unit and a plurality of wireless handsets. The base unit has a base transceiver and a memory for storing stored information. Each handset has a handset transceiver for establishing a data link and an audio link over a shared RF channel with the base unit via the base transceiver, wherein the data link is for transmitting signaling information and the audio link is for transmitting voice data for a real-time telephone conference. The handset requests from the base unit certain stored information. In response, the base unit retrieves the requested stored information from the memory and transmits the stored information to the handset via the audio link.

DESCRIPTION OF THE PREFERRED EMBODIMENT

Figure 1:
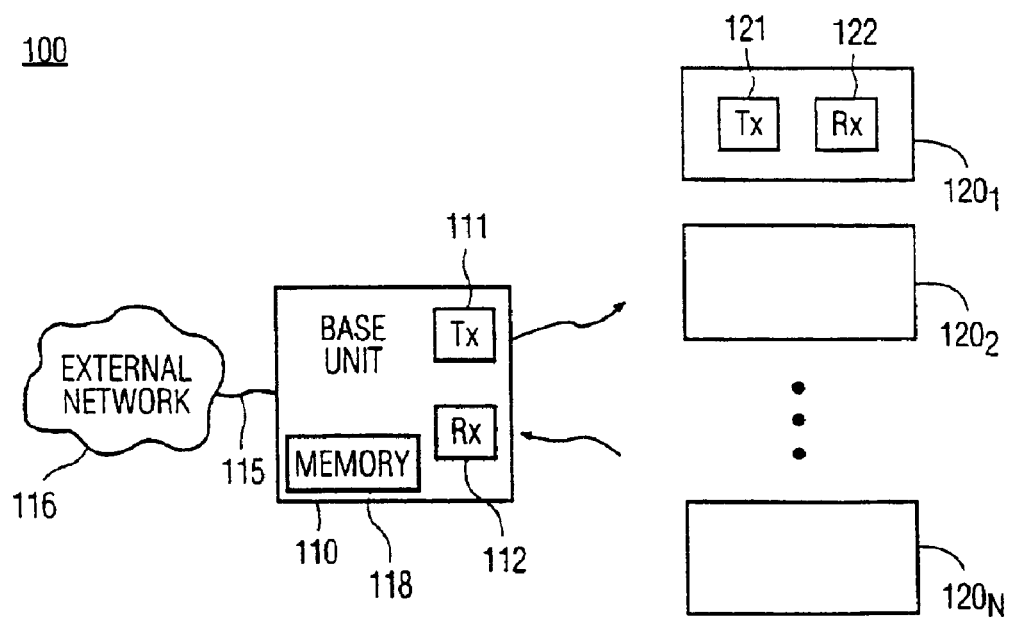
FIG. 1 is a block diagram of TDMA multi-line wireless telephone system, in accordance with an embodiment of the present invention.

Referring now to FIG. 1, there is shown a block diagram of TDMA multi-line wireless telephone system 100, in accordance with an embodiment of the present invention. TDMA system 100 comprises a base unit 110, which has receiver and transmitter units 112 and 111, respectively, and is coupled to external telephone network 116 via telephone line(s) 115. Base unit 110 has a memory or storage device 118, such as a RAM or hard disk drive, for storing stored data. System 100 also comprises N wireless handsets $120_1$, $120_2$, . . . $120_N$. Each has a transmitter and receiver unit (transceiver), such as transmitter 121 and receiver 122 of handset $120_1$. At any given time, some number (or none) of the handsets are operating or off hook (i.e., in the process of conducting a telephone call). System 100 thus provides a wireless network between the base station 110 and each handset $120_i$ ($1 \leq i \leq N$). In one embodiment, system 100 comprises 4 handsets $120_1$–$120_4$, all of which may be active simultaneously. In another embodiment, system 100 comprises a different number of handsets, e.g. N=12, or which up to 8 can be active or operational at a time.

In one embodiment, the present invention comprises a TDMA system for connecting multiple transceivers to a base station over a single RF channel. In particular, system 100 employs a digital TDMA scheme, as described in further detail below, which allows power to be efficiently used since each operating handset is "off" (i.e., not transmitting or receiving data, and thus not using as much battery power) during most portions of the TDMA epoch, and is only "on" during its own time slices or slots. In another embodiment, a handset powers off by switching off power to at least its CPU and transceiver (receiver and transmitter) units, while leaving powered on only a clock and associated timer or watchdog circuitry sufficient to wake up the CPU at a predetermined slot time.

Figure 2:
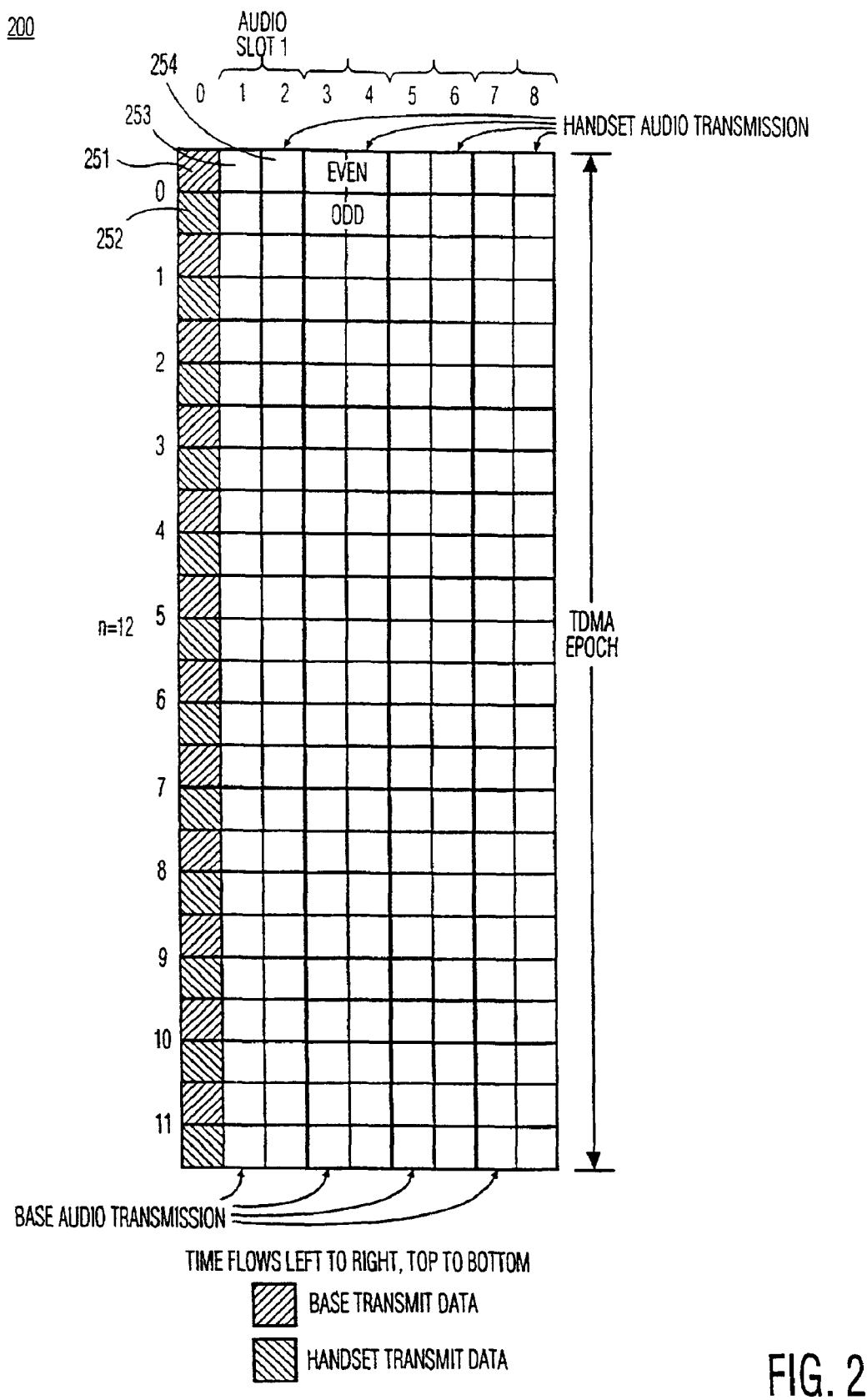
FIG. 2 is a schematic representation of the TDMA slot structure used in the TDMA scheme of the system of FIG. 1, in accordance with an embodiment of the present invention.

Referring now to FIG. 2, there is shown a schematic representation of the TDMA slot structure 200 used in the TDMA scheme 200 of the system of FIG. 1, in accordance with an embodiment of the present invention. System 100 employs a TDMA epoch having structure 200, which is illustrated assuming 12 total handsets $120_1$–$120_{12}$, of which 8 can be active or operational at a time, e.g. handsets $120_1$–$120_8$. TDMA epoch structure 200 comprises a number of rows and columns. Each row of TDMA structure 200 represents a 2 ms field of digital data, and is either even or odd and grouped in a pair with an odd or even, respectively, row or field. TDMA epoch structure 200 is a 48 ms epoch.

In normal mode of operation, each field comprises nine total packets: a (non-audio) data packet in the first column (either transmitted from the base or from a handset) and eight audio packets, grouped in 4 pairs of two. Each such pair of audio packets in a row includes one packet (time slot) of base audio transmission (to a given handset from base unit 110) and one packet of handset audio transmission (from the given handset to the base). Thus, within each epoch, there is allocated to each handset one pair of data packet slots and several pairs of audio packet slots. The data packet slots are used to establish a "data link" with each respective handset, and the audio packet slots are used to establish an "audio link" with each respective handset. The data links together constitute the system's data channel, while the audio links constitute the system's audio channel. In other words, the first column of TDMA epoch structure 200 corresponds to the data channel (data links), and the remaining columns correspond to the audio channel (audio links).

The data link for a given handset is used to transmit, via data packets, non-audio data referred to generally herein as signaling information. Each data packet is a set of data transmitted either to a given handset from the base unit or vice-versa, during a discrete time slot during which time no other handsets receive or transmit data over the system's data channel. These data packets may contain various types of data, such as synchronization data or words with time stamp information transmitted to a handset in sleep mode, caller ID information, incoming call information, telephone number being dialed by the handset, and the like. The signaling information conveyed by the data link is used to setup calls, inform the handset of incoming calls, maintaining the communication links between the handsets and base, and the like.

Voice data, i.e. audio packets containing audio data for a real-time telephone conversation, is transmitted over the audio link for a given handset. The bandwidth for the audio link for a handset is much higher than the bandwidth for the data link. This is because, within each epoch, there is allocated to each handset one pair of data packet slots and several pairs of audio packet slots. For example, for N=12 total handsets $120_1$–$120_{12}$ with up to 8 off hook at a time, there are 12 audio packet pairs per handset per epoch, compared to 1 data packet pair per handset per epoch, for an audio channel (or link) bandwidth 12 times greater than the data channel (or link) bandwidth. The audio packets contain digitized (and possibly compressed) voice information.

Thus, for example, row pair 0 comprises an even row and odd row. In the even row, the base transmits data in the first time slot (slot 251), to one of the 12 handsets, e.g. handset $120_1$. There is one row pair in epoch 200 for each handset, so that each handset can receive and transmit data to base unit 110 once per epoch. After the first data slot 251, assuming handset $120_1$ is operational (off hook), an audio packet is transmitted to handset $120_1$ in audio packet slot 253, then an audio packet is transmitted by handset $120_1$ to base unit 110 in audio packet slot 254, and so on for 3 of the other handsets until the end of the field or row. In the odd row for row pair 0, data slot 252 is used to receive data transmitted from handset $120_1$ to base unit 110, and audio packets are transmitted for the remaining 4 active handsets. In row pairs 1–11, the same sequence occurs, except the data packets are to and from different handsets than for row pair 0.

It is desirable for a handset user to be able to retrieve stored data which is stored in memory 118 of the base unit 110. This information is in addition to signaling data typically transmitted via the data link and voice data typically transmitted via the audio link. Stored data includes all stored/backed up information that is available in the base unit. This information may represent voice, data, or other service information. For example, the stored data may be a voice mail information, caller ID information, or other service information.

Such stored information is typically requested by a handset via its data link, since the request is itself a type of signaling information. Because the stored data is not audio data pertaining to a concurrent telephone call, it could be transmitted via the data link. However, this may be impractical or undesirable because the bandwidth of the data link is lower than that of the audio link. Therefore, in the present invention, when stored information is requested by a handset, the audio link is temporarily converted to a "stored data" link voice data transmission is temporarily halted (muted or interrupted), and stored data is transferred to the handset during that handset's audio data slots. This allows the stored data to be transmitted at a much higher rate to the handset than if the lower-bandwidth data link were used.

In the present invention, first, a handset $120_i$ requests stored data from base unit 110. Base unit 110 then fetches the stored data from memory 118, and combines the stored data into the voice link for handset $120_i$ as digital information. Since handset $120_i$ has knowledge about its request, it knows what type of stored data to expect on its audio link, and thus knows which type of decoding or processing to use when the stored information is received.

For example, if a voice mail message is to be retrieved, handset $120_i$ transmits an appropriate request for the voice mail message to base unit 110 via its data link. Base unit 110 retrieves the stored voice mail data, which may be stored in compressed format for efficient use of memory 118. This compressed, digital information representing the requested voice mail message is then transmitted to handset $120_i$ via its audio link, instead of its data link. Handset $120_i$ then processes the stored data received via its audio link through its voice decompression engine. On the other hand, if caller ID information is retrieved, then the data coming over the audio link is appropriately processed and displayed on the handset's display.

The present invention, therefore, creates an asymmetrical link for information retrieval in a wireless system so that efficient use of the available bandwidth is possible.

In an alternative embodiment, the audio link is used to retrieve stored data only if it is not already in use. In this case, the data link is used by a handset to request retrieval of stored data. If the audio link is in use by the handset, then the data link is used to transmit the stored data to the handset. However, if the audio link is not in use, then the audio link is used instead as a "stored data" link to transmit the stored data at a higher rate.

In an alternative embodiment, the stored information retrieved by a handset is not actually stored in base unit 100, but is stored in a device external to base unit 110, such as an external PC or storage device, which is coupled by a suitable interface to base unit 110. In this case, the stored information is retrieved by the handset from the storage device, via base unit 110, and the storage device is considered to be the same as memory 118, whether located in base unit 110, directly accessible by base unit 110, or accessible by base unit 110 via some interface. For purposes of this application, therefore, any information stored either directly in base unit 110 or in a device functionally coupled thereto such that the base unit is able to provide the stored data upon request to a handset, is considered to be information stored in base unit 110, since from the point of view of a handset, the request is made of base unit 110 and the information provided by base unit 110 appears to be stored in base unit 110.

One skilled in the art will recognize that the wireless system described above according to the principles of the invention may be a cellular system where base unit 110 represents a base station serving one of the cells in a cellular telephone network.

In an alternative embodiment, instead of a handset retrieving over the audio link data actually stored in memory 118, the handset may wish to retrieve data from a data source accessible to the base unit 110. For example, base unit 110 may receive via an external line a modem signal containing data. In this case, the handset may be coupled to a telephone data port of a computer, for example. The handset requests from base unit 110 to be connected to a data source or channel, such as that provided by the modem. Base unit 110 then transmits the data decoded from the modem, to the handset via the audio link.

What is claimed is:

1. A wireless telephone system, comprising:
   (a) a base unit having a base transceiver; and
   (b) a plurality of wireless handsets, each handset comprising a handset transceiver for establishing with the base unit via the base transceiver a time-division multiple access (TDMA) data link and a TDMA audio link, in accordance with a TDMA epoch allocating exclusive data and audio packet time slots to each handset, wherein the data link is for transmitting signaling information and the audio link is for transmitting voice data for a real-time telephone call, wherein the base unit, upon request from a handset for data from a data source, retrieves the requested data from the data source and transmits the retrieved data to the handset via the audio link, wherein:
      the epoch has a plurality of transmit and receive data row pairs, wherein each row pair comprises:
         an even row comprising a transmit data time slot for a respective handset and a plurality of transmit and receive audio packet time slots for a portion of the maximum number of the plurality of handsets which may be communicating at a time, and
         an odd row comprising a receive data time slot for the respective handset and a plurality of transmit and receive audio packet time slots for the other portion of the maximum number of the plurality of handsets which may be communicating at a time; and
      each handset receives and transmits data packets via the receive and transmit data packet slots only once during each epoch, during the transmit and receive data row pair for each said handset, and, if the handset is communicating with the base unit, each handset receives and transmits audio packets during respective transmit and receive audio packet time slots of each row pair of the epoch.

2. The system of claim 1, wherein:
   the plurality of handsets comprises 12 handsets, 8 of which may be communicating at a time: the epoch comprises 12 data row pairs, one data row pair for each handset; and each row pair comprises 8 transmits and receive audio packet time slot pairs for audio communications for the communicating handsets.

3. The system of claim 1, wherein the data source is a memory for storing data and the requested data is stored in the memory.

4. The system of claim 3, wherein the base unit comprises the memory.

5. The system of claim 3, wherein the base unit is coupled to an external computer comprising the memory.

6. The system of claim 3, wherein the base unit transmits the stored information to the handset via the audio link only if the handset in not currently using the audio link to transmit real-time telephone conference voice data, and transmits the stored information to the handset via the data link if the handset is currently using the audio link to transmit real-time telephone conference voice data.

7. The system of claim 3, wherein the stored information is one of stored caller ID information and stored compressed voice mail message data.

8. The system of claim 7, wherein the handset requesting the stored information processes the stored information upon receipt in accordance with the nature of the stored information.

9. In a wireless telephone system comprising a base unit having a base transceiver and a plurality of wireless handsets, each handset comprising a handset transceiver, a method comprising the steps of:
   (a) establishing, with each handset via its handset transceiver, a time-division multiple access (TDMA) data link with the base unit via the base transceiver, and, with each handset that is communicating with the base unit, a TDMA audio link with the base unit via the base transceiver, in accordance with a TDMA epoch allocating exclusive data and audio packet time slots to each handset, wherein the data link is for transmitting signaling information and the audio link is for transmitting voice data for a real-time telephone call;
   (b) requesting, with the handset, from the base unit, data from a data source;
   (c) retrieving, with the base unit, the requested data from the data source in response to the request; and
   (d) transmitting the retrieved data from the base unit to the handset via the audio link, wherein:
      the epoch has a plurality of transmit a receive data row pairs, wherein each row pair comprises:
         an even row comprising a transmit data time slot for a respective handset and a plurality of transmit and receive audio packet time slots for a portion of the maximum number of the plurality of handsets which may be communicating at a time, and
         an odd row comprising a receive data time slot for the respective handset and a plurality of transmit and receive audio packet time slots for the other portion of the maximum number of the plurality of handsets which may communicating at a time; and
      each handset receives and transmits data packets via the receive and transmit and receive data row pair for each said handset, and, if the handset is communicating with the base unit, each handset receives and transmits audio packers during respective transmit and receive audio packet time slots of each row pair of the epoch.

10. The method of claim 9, wherein the data source is a memory for storing data and the requested data is stored in the memory.

11. A base unit for communicating with a plurality of wireless handsets, each handset comprising a handset transceiver, the base unit comprising:
   (a) a base transceiver for establishing a time-division multiple access (TDMA) data link with each handset via the base transceiver, and, with each handset that is communicating with the base unit, a TDMA audio link via the base transceiver, in accordance with a TDMA epoch allocating exclusive data and audio packet time slots to each handset, wherein the data link is for transmitting signaling information and the audio link is for transmitting voice data for a telephone call; and
   (b) a memory for storing stored information, wherein the base unit, upon request from the handset for stored information stored in the memory, retrieves the requested stored information from the memory and transmits the stored information to the handset via the audio link wherein:
      the epoch has a plurality of transmit and receive data row pairs, wherein each row pair comprises:
         an even row comprising a transmit data time slot for a respective handset and a plurality of transmit and receive audio packet time slots for a portion of the maximum number of the plurality of handsets which may be communicating at a time, and
         an odd row comprising a receive data time slot for the respective handset and a plurality of transmit and receive audio packet time slots for the other portion of the maximum number of the plurality of handsets which may be communicating at a time; and each handset receives and transmits data packets via the receive and transmit data packet slots only once during each epoch, during the transmit and receive data row pair for each said handset, and, if the handset is communicating with the base unit, each handset receives and transmits audio packets during respective transmit and receive audio packet time slots of each row pair of the epoch.

12. The base unit of claim 11, wherein the data source is a memory for storing data and the requested data is stored data stored in the memory.

13. A wireless telephone system, comprising:
(a) a base unit having a base transceiver; and
(b) a plurality of wireless handsets, each handset comprising a handset transceiver for establishing a data link and an audio link with the base unit via the base transceiver, wherein the data link is for transmitting signaling information and the audio link is for transmitting voice data for a real-time telephone call, wherein the base unit, upon request from a handset for non-voice data from a data source, retrieves the requested data from the data source and transmits the retrieved data to the handset via the audio link if the handset if not currently using the audio link to transmit real-time telephone conference voice data and transmits the stored information to the handset via the data link otherwise.

14. The wireless telephone system of claim 13 wherein when said stored data is requested said audio link is temporarily converted to a stored data link, voice data transmission is halted temporarily and said requested stored data is transmitted during said handset's audio data slots at a higher rate than if a lower rate data link were used.

* * * * *